(12) United States Patent  (10) Patent No.: US 9,125,140 B2
Maniatopoulos et al.  (45) Date of Patent: Sep. 1, 2015

(54) BACKGROUND SCANNING METHOD FOR WLAN CLIENT DEVICES

(75) Inventors: Alexandros Maniatopoulos, Patras (GR); Orjan Fritz, Hagersten (SE); Ulf Landberger, Spanga (SE)

(73) Assignee: Samsung Electronics Co., Ltd (KR)

( * ) Notice: Subject to any disclaimer, the term of this patent is extended or adjusted under 35 U.S.C. 154(b) by 457 days.

(21) Appl. No.: 12/519,997

(22) PCT Filed: Jan. 3, 2008

(86) PCT No.: PCT/SE2008/050008
§ 371 (c)(1),
(2), (4) Date: Oct. 2, 2009

(87) PCT Pub. No.: WO2008/094107
PCT Pub. Date: Aug. 7, 2008

(65) Prior Publication Data
US 2010/0080134 A1  Apr. 1, 2010

(30) Foreign Application Priority Data
Jan. 31, 2007 (SE) ........................................ 0700244

(51) Int. Cl.
*H04W 4/00* (2009.01)
*H04W 48/16* (2009.01)
*H04W 84/12* (2009.01)
*H04W 52/02* (2009.01)

(52) U.S. Cl.
CPC .......... *H04W 48/16* (2013.01); *H04W 52/0238* (2013.01); *H04W 84/12* (2013.01)

(58) Field of Classification Search
USPC ......... 370/352, 338, 329, 331, 353, 354, 328; 455/450, 436, 439, 442, 33.2, 434, 455/426.2, 555, 550.1
See application file for complete search history.

(56) References Cited

U.S. PATENT DOCUMENTS

| | | | |
|---|---|---|---|
| 6,901,276 B1 | 5/2005 | Skinner et al. | |
| 7,496,158 B2 * | 2/2009 | Fudge et al. | .................. 375/340 |
| 2002/0147024 A1 * | 10/2002 | Wan | .............................. 455/515 |
| 2002/0177446 A1 | 11/2002 | Bugeja et al. | |
| 2004/0114535 A1 * | 6/2004 | Hoffmann et al. | ............ 370/252 |
| 2004/0120278 A1 | 6/2004 | Krantz et al. | |
| 2004/0153676 A1 * | 8/2004 | Krantz et al. | ................. 713/300 |
| 2004/0176039 A1 | 9/2004 | Leyh et al. | |
| 2005/0107088 A1 | 5/2005 | Oura | |

(Continued)

FOREIGN PATENT DOCUMENTS

| | | |
|---|---|---|
| EP | 1450240 A2 | 8/2004 |
| JP | 2005159771 A2 | 6/2005 |

(Continued)

*Primary Examiner* — Zewdu A Beyen
(74) *Attorney, Agent, or Firm* — The Farrell Law Firm, P.C.

(57) ABSTRACT

Background scan for 802.11 client devices allows them to keep most of its components in low power mode when certain criteria are not met. A method for changing dynamically those criteria according to the air data traffic conditions is described in the present invention. This increases the time the system remains in sleep mode and consequently improves the standby current consumption to portable 802.11 enabled media.

21 Claims, 9 Drawing Sheets

(56) References Cited

U.S. PATENT DOCUMENTS

| | | |
|---|---|---|
| 2006/0014537 A1 | 1/2006 | Arai et al. |
| 2006/0068751 A1* | 3/2006 | Chandra et al. ............ 455/343.2 |
| 2006/0148487 A1 | 7/2006 | Kim et al. |
| 2006/0270412 A1* | 11/2006 | Willins et al. ................. 455/445 |
| 2007/0004405 A1* | 1/2007 | Buckley et al. ............... 455/434 |
| 2008/0130595 A1* | 6/2008 | Abdel-Kader ............... 370/338 |

FOREIGN PATENT DOCUMENTS

| | | |
|---|---|---|
| JP | 2006013594 A | 1/2006 |
| JP | 2006086596 A2 | 3/2006 |
| KR | 1020040051315 | 6/2004 |
| WO | WO 03/001688 | 1/2003 |
| WO | 2006025024 A1 | 3/2006 |
| WO | 2006043161 A1 | 4/2006 |

\* cited by examiner

BACKGROUND SCANNING METHOD FOR WLAN CLIENT DEVICES

TECHNICAL FIELD

The present invention relates to a WLAN client device and a method adapted for such device.

BACKGROUND OF THE INVENTION

The access point (AP) in a Wireless Local Area Network (WLAN) provides a local relay function for the client devices associated with this (AP). This mode of operation is called Infrastructure Basic Service Set according to the standard specification IEEE 802.11 [ref. 1]. The Infrastructure Basic Service Set is characterized by an ID which is called ESSID. In Wi-Fi Wireless LAN computer networking, an Extended service set identifier (ESSID) is a code attached to all packets on a wireless network to identify each packet as part of that network. All wireless devices attempting to communicate with each other must share the same ESSID. Apart from identifying each packet, ESSID also serves to uniquely identify a group of wireless network devices used in a given "Service Set".

Any WLAN client device should be able to scan the communication medium in order to detect APs transmitting at a certain channel. As long as the client device has not been connected to any AP, it can perform the scan operation as a background activity.

Background scan for 802.11 client devices non-connected to an AP should be implemented in a way that most of the device's components are kept in low power mode until certain criteria are met.

Portable apparatus supporting 802.11 Wireless Local Area (WLAN) protocol must handle efficiently their power consumption in order to increase their operation and stand by time. In some applications the WLAN functionality is enabled and disabled by the user but in many others a WLAN system always in operation and able to optimize and adjust its power consumption transparently is strongly desired. The capability of the self adjustment is essential when the WLAN apparatus is in association state, transferring data through an Access Point (AP) or just listening to the beacons, but it is also important and trickier when the device operates in a non-connected mode and performs background scan in order to discover available networks.

Background scan in non-connected mode should be the only wireless LAN network function executed by portable devices when it is in stand by mode and the user or the user's application must be notified as soon as a WLAN network has been detected. From this aspect, the power consumption due to the execution of this function affects directly the standby time of the device.

Typical examples of application that require efficient power management during the background scan of non-connected mode are those of Voice over IP (VoIP) phones and cellular phones with WLAN support. Such devices may not be connected either because no AP exist within their range or because the AP found in the same area do not fulfill certain criteria defined by the application or the user.

BRIEF DESCRIPTION OF THE INVENTION

The object of the present invention is to save power, e.g. battery power of a WLAN device. This object is possible to achieve with a method for changing dynamically parameter criteria according to the air data traffic conditions in accordance with the present invention.

The present invention relates to a self adjusted background scan method for WLAN enabled client apparatus in non connected state. This method also comprises a power save function with a number of states. The adjustment is referring to the dynamic changes of air traffic condition parameters which affect the total system performance regarding power consumption and network detection speed.

Further, the present invention provides a WLAN client device supporting this method comprises analog and digital Hardware organized in layers which can be individually enabled or disabled. The said WLAN client device also comprises Software organized in layers in direct correspondence with the Hardware layers. An additional Software layer is the management Layer which is responsible for the optimization of several device system functions. Part of the SW management layer is the background scan algorithm of the not-connected mode.

The present invention relates to client WLAN apparatus which are not connected to an AP but want to associate as soon as they discover a network which meets some predefined conditions. This invention intends to minimize the power consumption of the circuit which is responsible for the WLAN functionality in an apparatus. This invention also intends to minimize the time the WLAN apparatus needs to detect the AP and notifies that to the user or user's application. This apparatus may comprise circuits for other functions or only WLAN related circuits.

From another aspect, the proposed method implies a layered structure network apparatus. The upper layers configure the algorithm for the background network scan of the non connected state executed by the lower ones and then they switch to power down mode until a network infrastructure has been found. This algorithm is self adjusted based on the configuration settings of the upper layers and aiming to efficient network scanning in order to minimize power consumption. However, it must ensure that the user or the application will be notified about the discovery of a wireless network at the shortest possible time from the moment the user enters the range of the AP.

The present invention supports both active and passive scan mode and dynamic switch between them during background scan in not-connected mode.

The proposed invention is compliant with the 802.11 standard

This increases the time the system remains in sleep mode and consequently improves the standby current consumption to portable 802.11 enabled media.

DETAILED DESCRIPTION OF THE INVENTION

Figure 1:
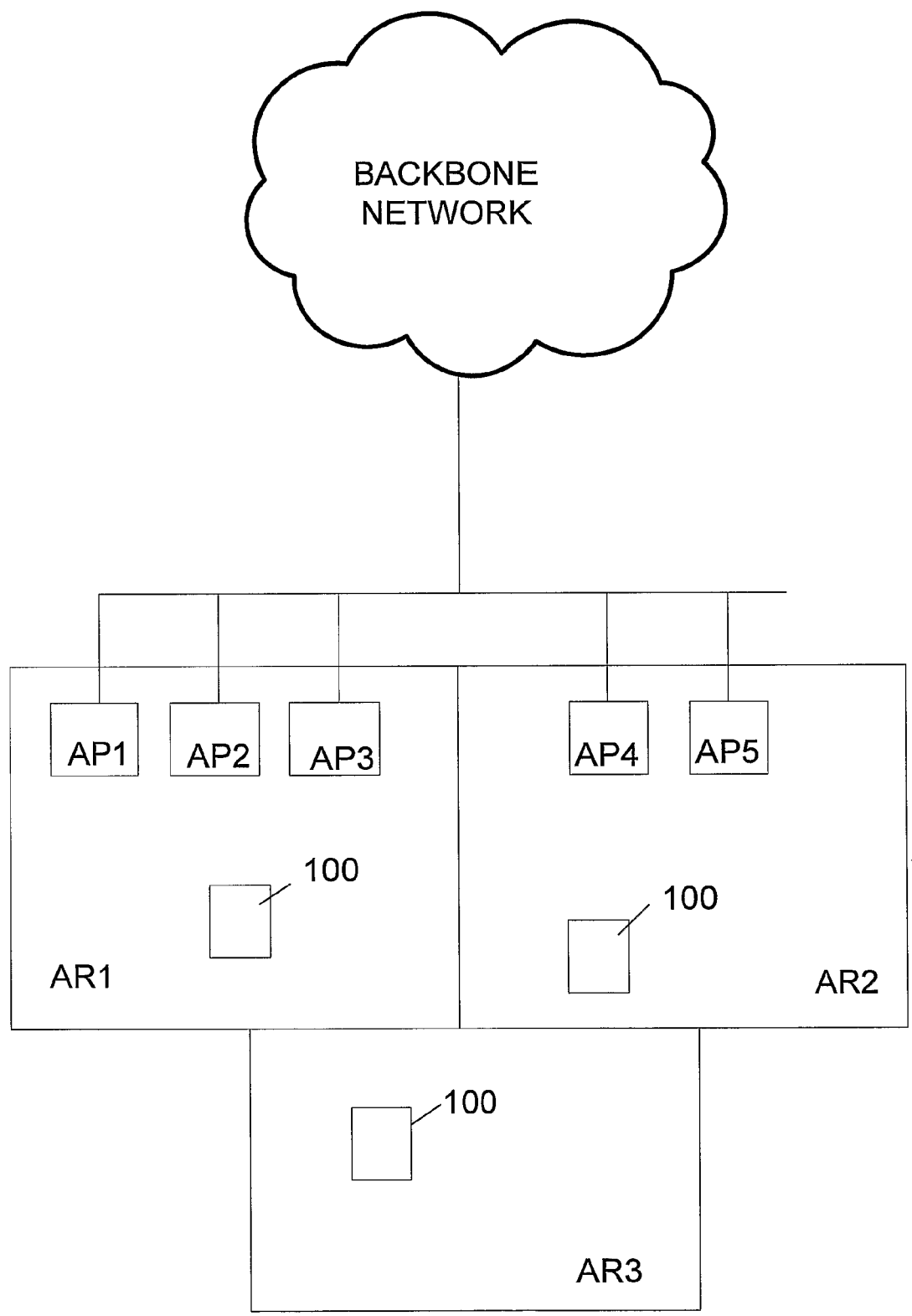
FIG. 1 is a schematic illustration of a standard WLAN network.

In FIG. 1, a schematic WLAN network is illustrated. The WLAN network is operatively connected to a backbone network, e.g. internet.

The network 5 comprises a number of Access Points AP AP1, AP2, AP3, . . . for wireless communication with user handled mobile portable wireless client devices, even denoted as user terminals, over the air interface between the APs and the devices. A user terminal may connect to one AP at a time over a radio channel situated on a frequency within a frequency band, which will be described more in detail further down.

A wireless client device 100 is provided with a radio unit comprising receiver and transmitter circuits adapted for communication according to the IEEE standard 802.11. Said unit is operatively connected to an antenna device. The user terminal is also provided with at least one computer or digital processing unit, such as a central processing unit (CPU), connected to In/Out-units and program software and data storage means (not shown) for controlling the functions, different equipment units and other applications of the terminal. Even the terminal will be described in more detail.

A wireless client device 100 will be able to operatively connect to an AP on one channel in the air interface within an area limited by the transmitting range between the AP and the client device 100. Three different example areas AR1, AR2, AR3 are very schematically (as a rectangle; in reality the shape is more complicated) illustrated in FIG. 1. The first area AR1 comprises APs which a certain mobile client device may send a probe request for accessing the AP and the network it belongs to. The second area AR2 contains a number of APs to which the device is not allowed to access or the user does not want to send a request probe to. The third area AR3 does not contain any accessible APs, like a forest area, or the device is not allowed to transmit at all due to certain band restrictions set for said area.

In AR1 or when entering into AR1, a user may want the WLAN device 100 to connect to any of the APs AP1, AP2 or AP3 due to which AP connection that provides the best air data condition, e.g. RSSI. In this area, the device will operate in connected state and in active scanning mode.

In area AR2, the APs belong to operators which will not allow access to their APs, or the user does not want the mobile to send probe requests and wake up for each probe response. Therefore, it is an advantage in view of power consumption to remain in a non-connected state. In area AR3, there is no accessible or connectable AP, and active scanning would be a waste of power considered to passive scanning. However, passive scanning may also be a waste of battery power. Therefore, it would be favourable to adapt the scanning conditions and select the most favourable scanning method.

The background scan algorithm tries consistently to identify the conditions of the region a user enters each during his movement and adjust various systems parameters aiming to timely network discovery with the minimum possible consumption penalty.

The background scan algorithm should be tightly combined with a power save functionality provided that the client's hardware is able to support various power states by enabling and disabling individual functional blocks of the system. However, this should influence as less as possible the client's capability to detect and report appropriate networks for connection at the shortest possible time from the moment the user enters the range of the AP.

Figure 2A:
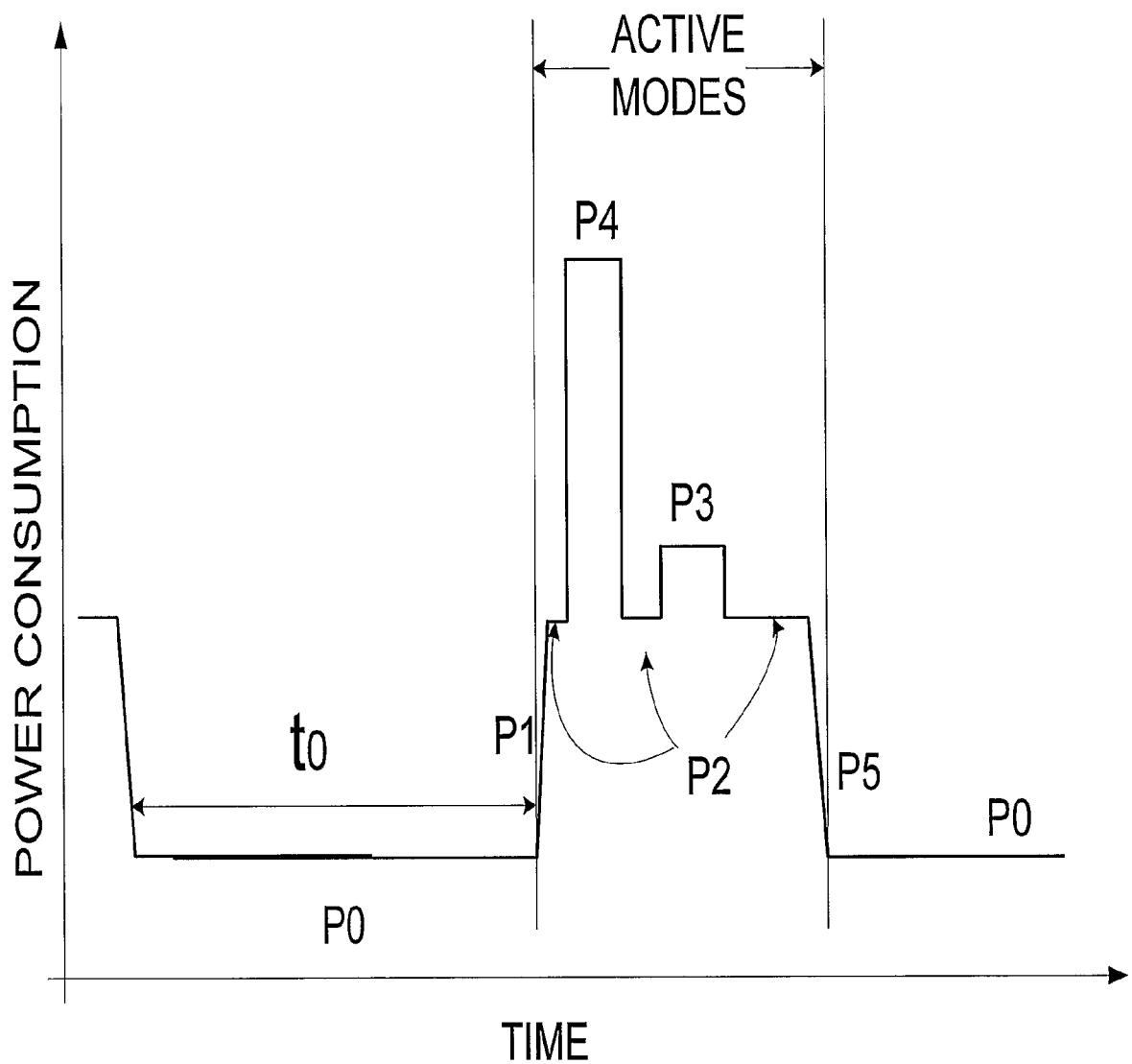
FIG. 2a is a power consumption over time diagram wherein the WLAN client device typical states during background scan in non connected mode.

FIG. 2a shows typical power states during the background scan. These states may be encountered in both connected and non connected mode of a WLAN client device. The main difference between the two modes is that in non connected mode this is the only operation that a device trying to discover available networks performs while in connected mode this operation may be combined with other functions like data exchange.

The state a non-connected WLAN device remains most of its time $t_0$ is P0, which is the doze state where the device must consume the lowest possible power. The duration $t_0$ of P0 is one of the parameters of the self-adjustment algorithm. When the user is moved into an area without APs the algorithm must decide to increase the duration of P0 and keep the device in low power mode as long as possible. When the user enters an area covered by APs, the algorithm can decide to decrease the P0 time immediately after detecting the first AP or remains in active mode until all channels are surveyed for possible APs. In this way, it minimizes the time and the power required for a full channel scan since it eliminates the number of transition states like P1 and P5. P1 corresponds to the transition from the doze state to the state P2, which is the state where the device is ready to listen and decode a packet in the air. Normal operations during P1 are system configuration, clock and PLL initialization and register programming. Similarly, P5 is the transition time from normal operation mode to the doze state P0. During P5, the system follows an opposite to P1 procedure trying to deactivate all those circuits that are not used in P0.

The remaining two states shown in FIG. 2a are the receive state P3 and transmit state P4. The difference between P2 and P3 is that in P3 the device is processing an incoming packet and more circuit is involved resulting to a relatively higher consumption than in P2.

Figure 2B:
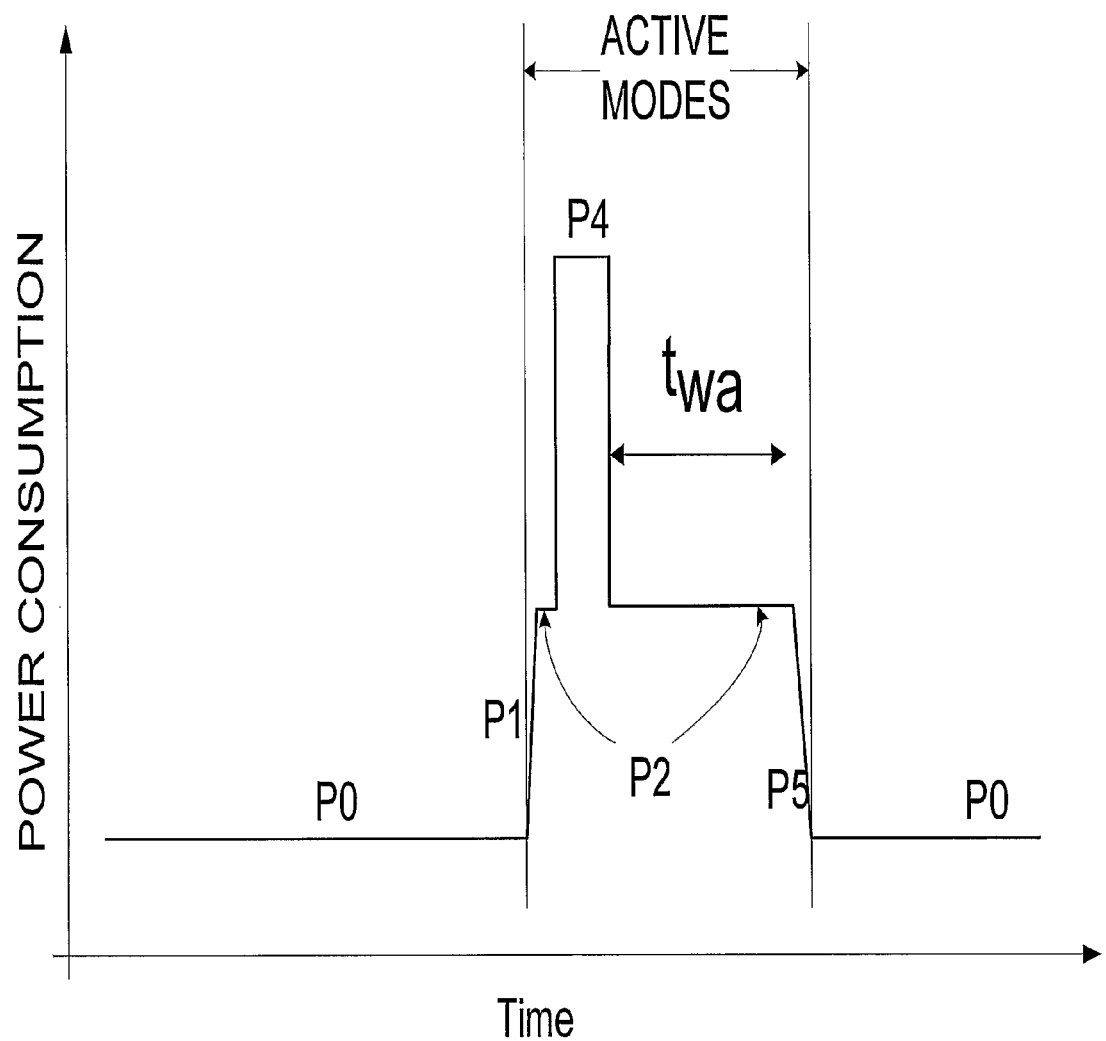
FIG. 2b is a power consumption over time diagram wherein the WLAN client device typical states during background scan in non connected mode but in active scan mode without receiving any valid packet or probe response during response expiration time $t_{wa}$.

The power consumption of state P4 in a WLAN system is usually higher than the other states and can be different for each transmission. A WLAN device in non-connected mode implementing the background scan algorithm transmits packets only when active scan is used. In active scan, the device multicasts IEEE 802.11 "Probe Request" packets waiting for "Probe Responses" from Access Points. The transmit power of the Probe Request packet in case of active scan is one more parameter that is adjusted dynamically by the algorithm. FIG. 2b is a power consumption over time diagram wherein the WLAN client device typical states during background scan in non connected mode but in active scan mode without receiving any valid packet or probe response during response expiration time $t_{wa}$.

Figure 2C:
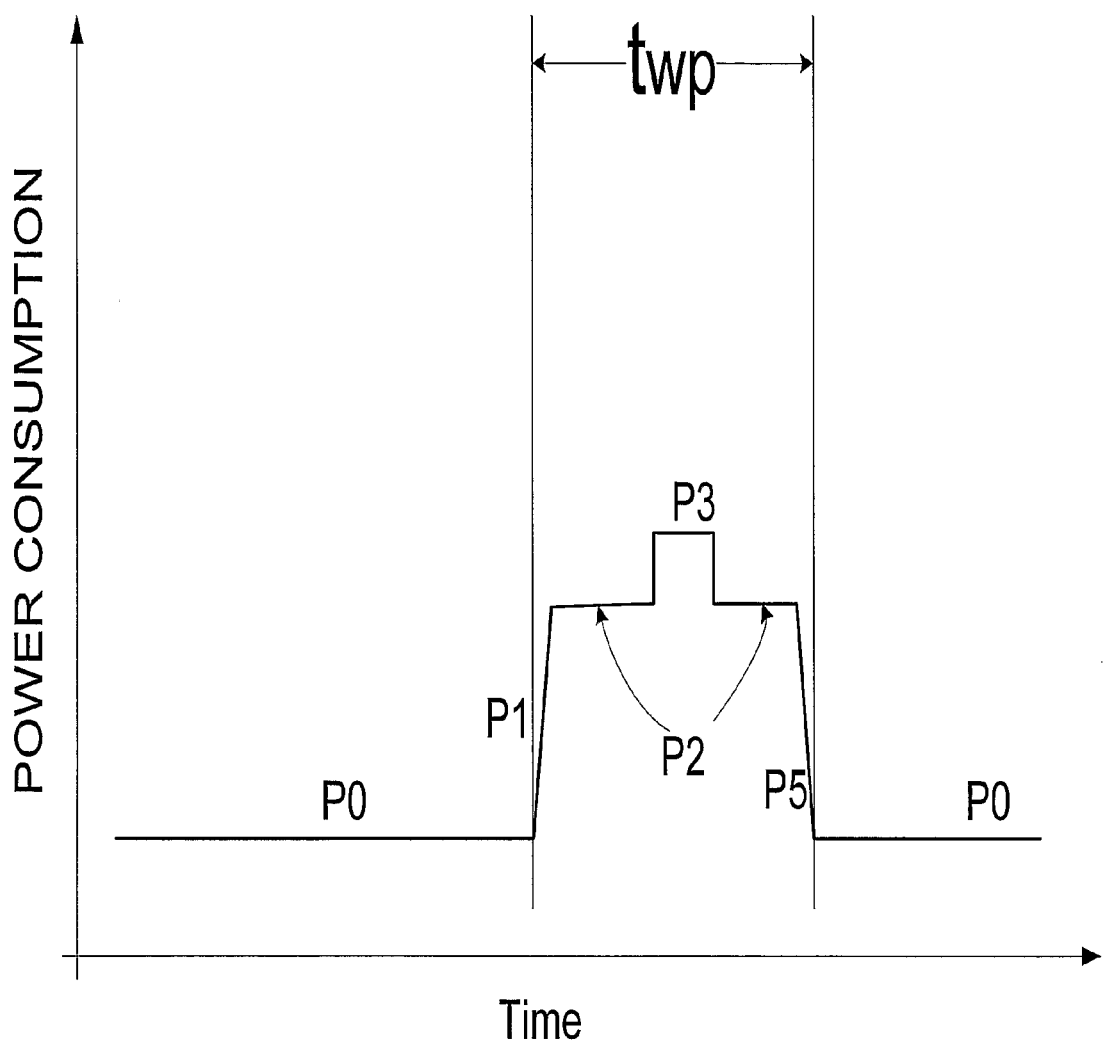
FIG. 2c is a power consumption over time diagram wherein the WLAN client device typical states during background scan in passive scan mode during expiration time $t_{wp}$.

FIG. 2c is a power consumption over time diagram wherein the WLAN client device typical states during background scan in passive scan mode during expiration time $t_{wp}$.

The parameters that are dynamically changed by the background scan algorithm are listed below:
1. Receiver filter bandwidth $B_R$.
2. Active scan versus Passive scan mode.
3. Doze duration $t_0$.
4. Transmit power $P_4$.
5. Settings of Response expiration time $t_{wa}$ and/or $t_{wp}$.

Receiver Filter Bandwidth

In a multiple cell network topology, overlapping and/or adjacent cells using different channels can operate simultaneously. The devices should incorporate adequate filtering in the reception in order to reject strong unwanted signals from adjacent channels.

In connected mode where the client is associated to an AP at a given channel, the receiving filter should be as effective as possible in order to reject interference caused by traffic on adjacent channels. Minimum requirements for adjacent channel rejection capabilities are usually provided by the specifications [ ]. However, in non connected mode and in cases of low traffic conditions, it might be desirable that a client can widen the bandwidth of its receiver. The bandwidth of each channel in 802.11a/g protocol (WLAN) is 20 MHz. This is shown in FIG. 4.

An ideal filter usable in a WLAN client device according to the invention would be able to receive all frequencies within this 20 Mhz space. Such a filter can be implemented in the RF and/or in the digital domain. Making this filter widened means either that add some poles or in the simpler case you switch between two or more filters that already exist in the design, in the analog and/or in the digital domain.

Figure 3:
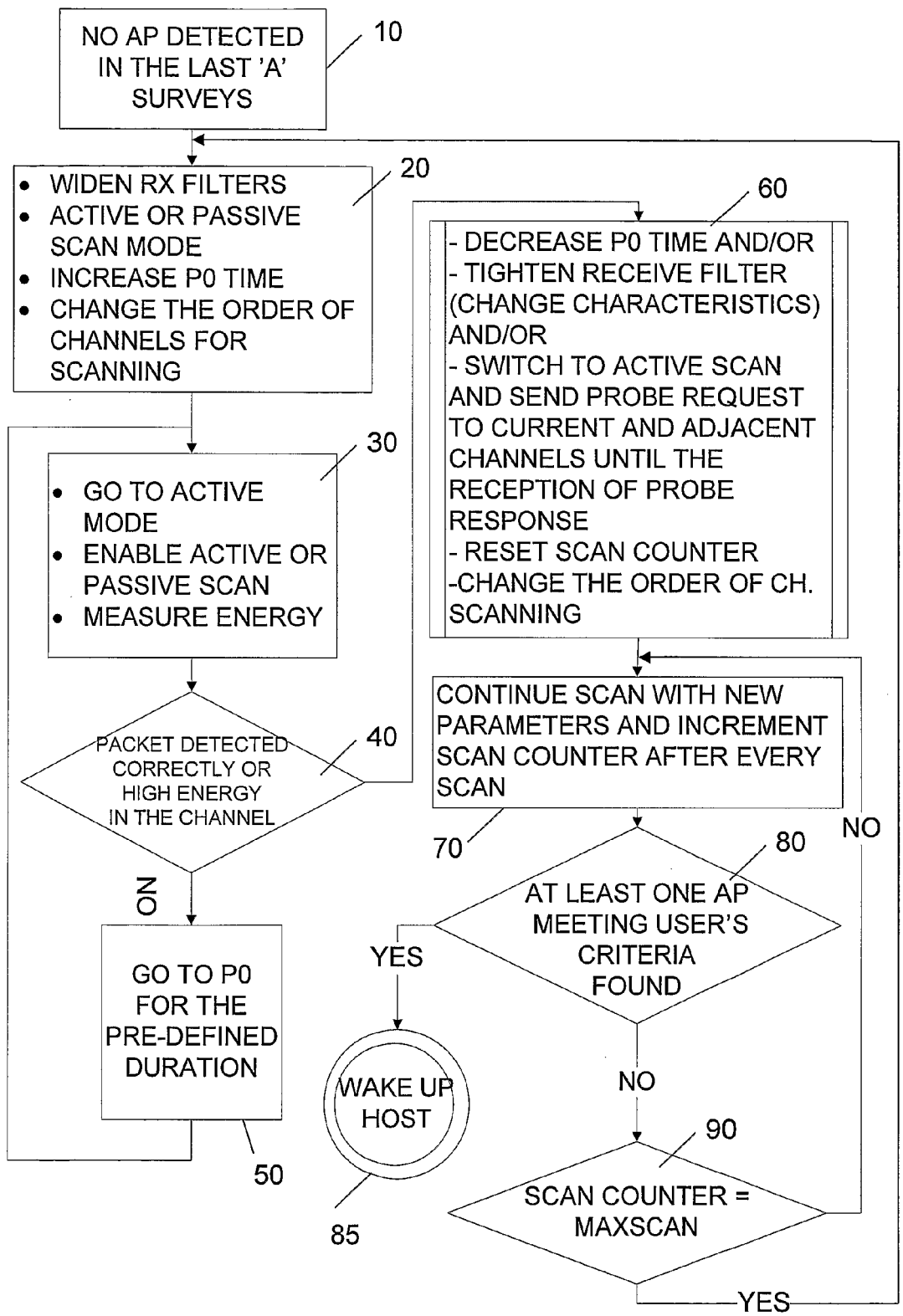
FIG. 3 is a flowchart showing an embodiment of the background scan algorithm
Figure 4:
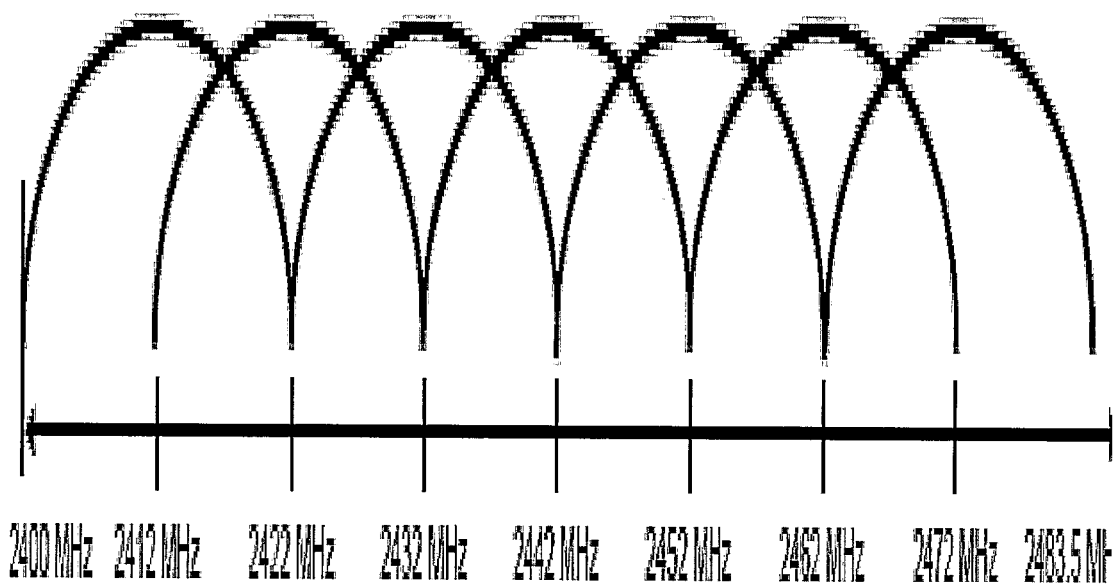
FIG. 4 shows the European channel selection-overlapping according to 802.11g/b specifications.

FIG. 4 shows the European channel selection-overlapping according to 802.11g/b specifications. By widening the filters of the receiver, the client can recognize traffic on adjacent channels or measure high level of energy in this band. In this case, the background scan algorithm can proceed to a self adjustment and a typical example is given in FIG. 3.

The background scan algorithm can also select between active and passive background scan mode taking into account the difference in power consumption between reception and transmission for the particular client, the traffic conditions, the user preferences regarding the acceptable detected networks and the capability of the receiver to listen to many channels simultaneously.

One preferred embodiment of the invented method is illustrated in the flowchart of FIG. 3.

The entering step of the method, step 10, will occur when no Access Point AP has been detected in the last area survey or the latest performed area survey. By area survey is meant a search for APs, regardless if it is active or passive scanning. The device has detected a non-connection state due to a detected condition, e.g. detecting means of the device has not detected a packet or a high energy during a predetermined number of scan trials or a predetermined time period has run out. In step 40, the background scan algorithm initiates the switch to a less power consuming mode (sleep mode), wherein the power consumption is P0, the doze power state (see FIGS. 2a-2c).

In step 20, a number of measures, denoted sub-steps, may be performed. In this step a number of parameters of the algorithm are adjusted and set. The device sets a bigger duration of $t_{p0}$ of the doze power state P0 so that the next time the system will go to doze mode from state 40, it will remain there longer, according to $t_{p0}$. As an example, the device will load a timer or clock in the device with a new value that increases the duration until a new scanning, passive or active is performed. Further, the bandwidth of the receiver filters is increased to enabling listening to the adjacent radio channels as described earlier. The traffic condition in the region where the user and the device is situated for the moment is negligible in all channels. In this way it can detect packets or energy from more channels every time it goes to active mode. It can also define the order in which the algorithm search the channels so that it can hop to non overlapping channels.

In the next step, step 30, the client will switch to a full power mode in order to perform active or passive scan, waits for possible incoming packet and measures the energy during the active mode period $t_{wp}$, as shown in FIG. 2c. The parameter $t_{wp}$ may also be adjustable by the invented algorithm.

If no valid packet and no high energy have been encountered and/or registered by the device, in step 40, the device will go back to P0 mode in step 50 without changing the background scan algorithm parameters. The to period that have been calculated in step 20 will start, in step 50, and the algorithm will remain in the described loop, steps 30-50, until a valid packet and/or high energy has been detected by the processor.

If a valid packet is detected or high energy has been measured in step 40, the device system enters step 60 and a number of parameters, at least one, is changed again. The P0 time will be decreased and/or the bandwidth of the receiver filter is decreased/tightened and/or the order of the channels which the algorithm uses for successive scanning operation will change as it is described below in this document. Further one action that may be performed in step 60 is to switch to Active scan mode, which in the following loop, involving steps 70, 80 and 90, implies the sending of Probe requests to current and adjacent channels until the reception of at least one Probe response or until a system timer expires. For this purpose, a reset of a scan counter is necessary.

In step 70, each channel is continuously scanned in accordance with the new parameters and the scan counter is incremented for each scan. When the number of scans registered by the scan counter reaches a predefined maximum scanning number, here defined as MaxScan, the device is controlled by the algorithm to return to the above described step 20.

If at least one Access Point is detected or registered that meets the user's predefined criteria (signal strength, operator, . . . ), the condition of step 80 is fulfilled ("yes"), the the host, i.e. CPU, of the WLAN device is powered up and waken up, step 85, in accordance with application standard routines. However, as long as the conditions of step 80 and step 90, respectively, is not fulfilled, the device will repeat the steps (70, 80 and 90) in said sub-loop of the invented algorithm.

WLAN Device

Figure 5:
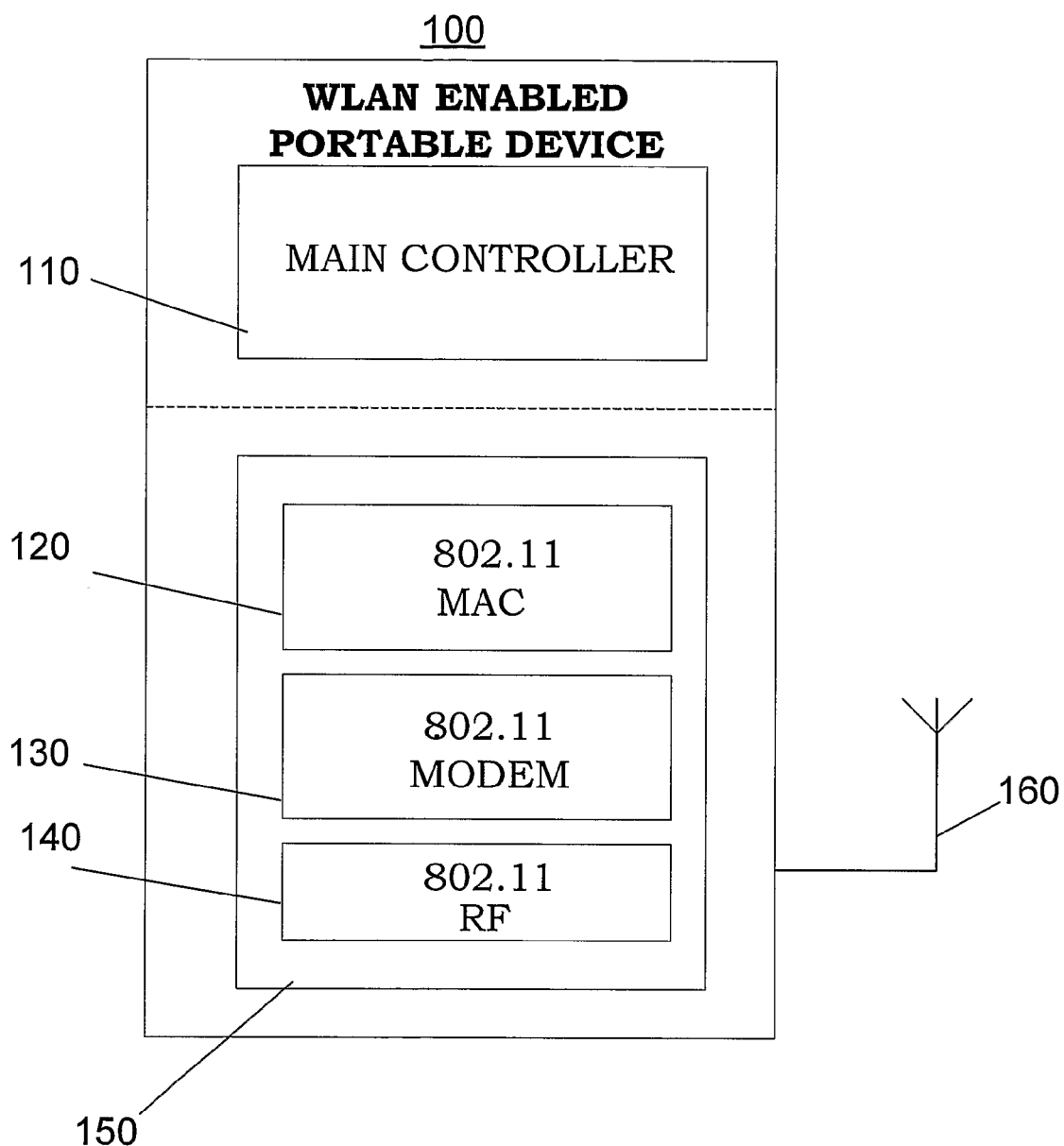
FIG. 5 is a block scheme illustrating a schematic WLAN device according to an embodiment of the invention.

From another aspect of the invention, the proposed method implies a layered structure network apparatus 100. The upper layers, Main controller 110, configure the algorithm for the background network scan of the non connected state executed by the lower ones and then they switch to power down mode until a network infrastructure has been found. FIG. 5 illustrates an embodiment of an implementation of the layers in a WLAN enabled portable device 100 that is capable of operating according to the invention. The lower layers that execute the algorithm are the 802.11 MAC (Media Access Control) 120, the 802.11 modem 130 and the 802.11 RF (Radio Frequency) 140. These layers, or means, may be implemented as a single 150 device or multiple silicon devices. The upper layer is responsible for the management and the configuration of the algorithm are implemented in the main controller of the portable device. In this way, the main controller 110 of the system can switch to a low power mode as long as the background scan algorithm is executed by the lower layers 120-140 and not satisfactory conditions indicating the presence of a desired WLAN network have been met. Those conditions are also defined by the controller before going to a low power mode and may refer to minimum energy thresholds, preferred list of ESSID, unwanted list of ESSID or others.

Use of RSSI threshold: Don't wake me up until you receive a signal strength that is higher than the set RSSI threshold, e.g –60 dBm.

Use of preferred ESSID list: don't wake me up until you receive a packet from any AP with ESSID included in this list Use of unwanted ESSID list: don't wake me up in case you receive a packet from an AP with ESSID included in this list.

Combination of the aforementioned criteria.

The figure illustrates a WLAN device supporting the standard IEEE 802.11. The WLAN device 100 comprises a controller 120 and a WLAN network adapter 150 that is connected operatively an antenna 160. The controller may be any data processing and instruction controlled device such as a CPU (central processing unit), microprocessor, computer, etc. All components are powered from a battery unit (not shown). At power up, it configures the parameters of the background scan algorithm. It provides the parameters, e.g. Receiver filter bandwidth, Active scan versus Passive scan mode, Doze duration, Transmit power, System backoff timers' settings, Response expiration timers' settings, thresholds for Received Signal Strength RSSI, etc. with values.

The controller configures the lower layer 150, denoted as the MAC- and physical layer (MAC/PHY layer), and the management layer 110 in the main controller is constituting the higher layer. After the power up and configuring, the controller goes in to sleep mode to save power. According to the invention, the layered structure allows most of the device components to go to sleep mode during the background scan while only the MAC- and physical layer components and functions responsible for the algorithm are executing said algorithm. The lower layer 150 is therefore responsible for the execution of the algorithm. The object of the invention to save power is therefore achieved in that the management layer 110 is in sleep mode while only the MAC- and physical layers components and functions responsible for the algorithm are executing said algorithm. The management layer will provide the configuration data to the MAC/PHY layer when requested. The configuration data is defined as a function vector comprising a number of arguments $$\text{function\_background\_scan\_vector}(arg^1, arg^2, arg^3, \ldots, arg^n)$$

wherein $arg^1$ may be receiver filter bandwidth, $arg^2$ may be the RSSI threshold value, $arg^3$ the doze duration parameter value, and so on for setting all algorithm parameters. The higher layer, i.e. the management, layer will order the MAC/PHY layer to start running the background scan function using selected arguments in the vector as start parameter values.

The invented method for background scanning WLAN channel frequency band for at least one Access Point in an area wherein the mobile client WLAN device is momentary located, and said client device is in non connected state, will perform dynamic changing of at least one of the parameter values due to changes of air data traffic conditions during the execution of the background scanning. Said dynamic changing involves increasing the bandwidth of a receiver filter (here incorporated in RF module/layer 140) when the device has not detected a valid packet or high energy on any channel for a certain time and/or number of channel scannings. Further, the device is capable of increasing the doze duration time to when the device has not detected a valid packet or high energy on any channel for a certain time and/or number of channel scannings (scanning operations). The device is also capable of decreasing the settings of response expiration time $t_w$ when the device has not detected a valid packet or high energy on any channel for a certain time and/or number of channel scannings. The WLAN client device is capable of increasing or decreasing the transmit power of the Probe request due to the result of the measure of received signal strength.

The device will comprise means for setting the device in active scan mode or passive scan mode. The device is set in active scan mode due to that the device has detected a valid packet or high energy on any channel and the AP fulfils the predetermined host/operator criteria. Further, the device is set in passive scan mode due to that the device has detected a valid packet or high energy on any channel but the AP does not fulfil the predetermined host/operator criteria.

According to an embodiment of the invented WLAN client device, the device is equipped with means for measuring and determine Received Signal Strength RSSI.

The WLAN device comprises means for changing Receiver filter bandwidth, which implementation is known by a person skilled in the art. Said means is possible to implement in many ways, such as in software or hardware. Even means for switching between Active scan or Passive scan mode is known to a skilled person in the art. Also said means is possible to implement in many ways, such as in software or hardware.

Means for setting and measuring Doze duration time $t_0$ is wellknown timer implementations according to the mentioned standard IEEE 802.11. Means for setting and measuring Response expiration is also regarded as standard equipment. Means for setting transmit power is well known in transmitter technology.

Order of Channel Scanning

Figure 6:
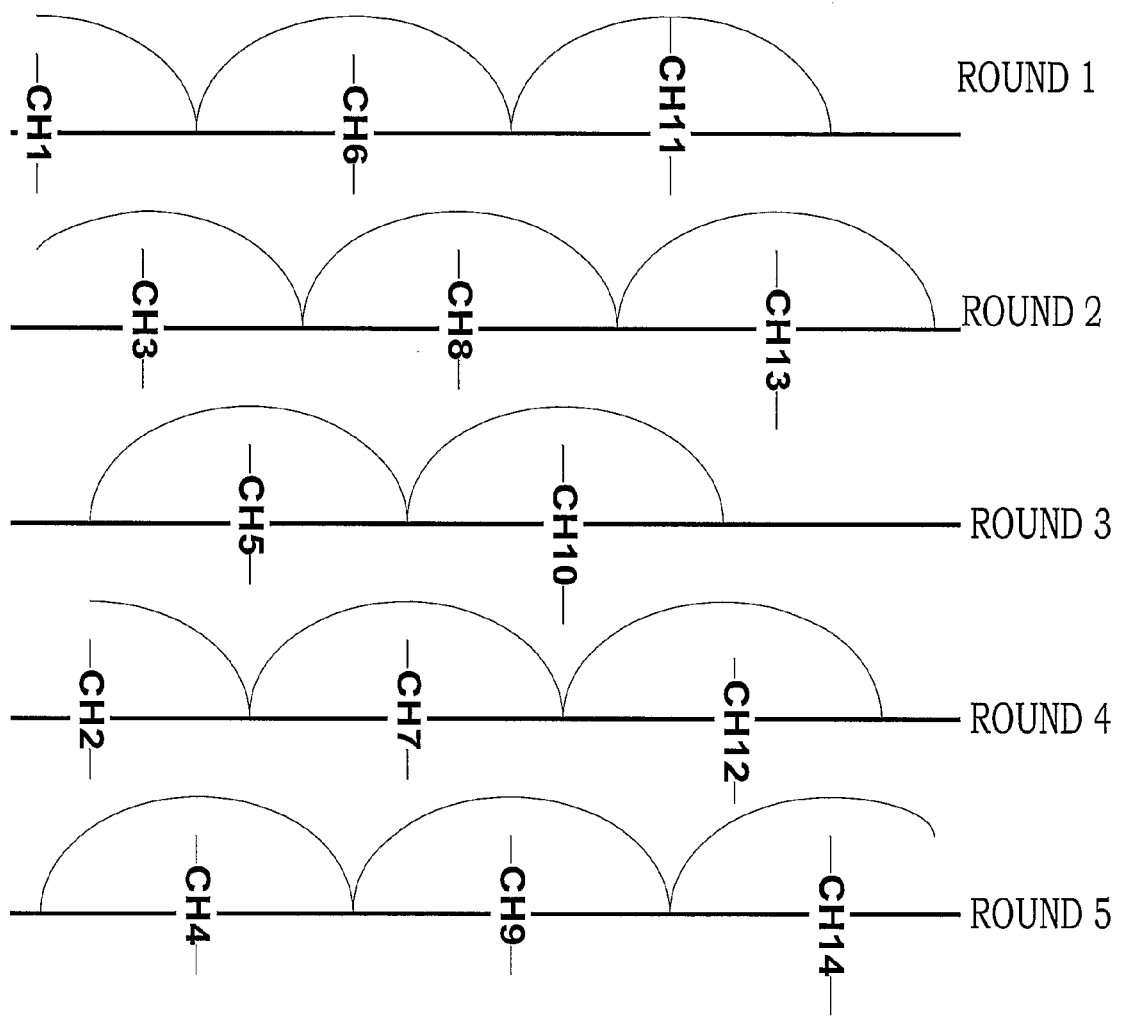
FIG. 6 is an example of the invention operation during channel scanning.

The client completes one round of the algorithm when all channels in its frequency band have been scanned, even if the method does not guarantee equal wireless network detection probability for all channels during the round. Considering the overlapping of the various channels according to IEEE 802.11, a non connected client, which has previously increased its receiving filtering bandwidth, is supposed to be able to detect energy or a packet transmitted in adjacent channels with a certain probability. The algorithm can take advantage of this property in order to adjust accordingly the order of the channels during successive scan operations. A typical example is shown in FIG. 6.

In 'Round A', the device will scan at channels 1, 6 and 11. When the device performs active or passive scan, it may be able to detect energy or packets from at least 3 adjacent channels of lower frequencies and 3 of higher frequencies. So, when the device listens to channel 6 it may be able to detect energy or packets transmitted in any of channels 3 to 9, depending on the power or the distance of the emitter. The more adjacent the channel the higher the probability to detect a packet transmitted in that channel. At the end of Round A, the client will have scanned three channels, 1, 6 and 11 and will have listened for some time to all other channels even with a smaller probability to detect something. In the next round, Round B, it will do the same by choosing three other channels with the maximum possible distance from the channels of the previous round.

Provided that the user has not masked out any channel, the device will run through additional rounds until it scans all channels of the frequency band, respecting every time the criteria of the maximum distance as mentioned above. In the particular example of FIG. 6, the device will need 5 rounds to scan once all channels.

Figure 7:
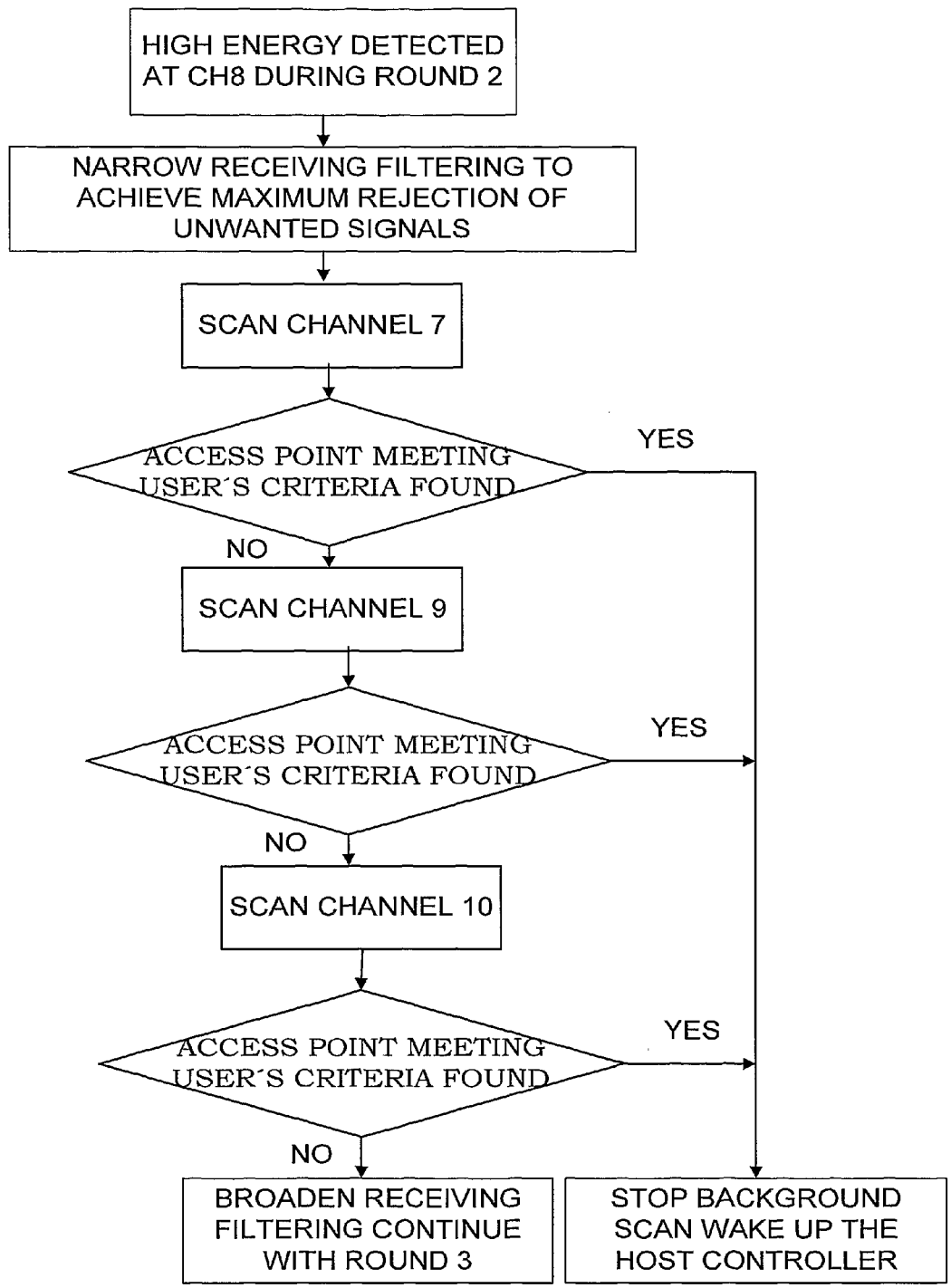
FIG. 7 is a flow chart illustrating an example of the invention operation during background scanning.

During the aforementioned procedure, if the device detects high energy when it operates in a specific channel, the scanning method will interrupt the current round, it will force the system to switch to a narrower receiving filter and it will start scanning the channels close to that area, starting from the most adjacent ones. This is shown in FIG. 7 where it is supposed that during Round 2 and while the client was looking for APs at channel 8, it detected a high energy. The device will then start scanning the adjacent channels, preferably using active scan, starting from channels 7 and 9 since it is most probable that the energy detected was due to a transmission in any of those 2 channels. It will also scan channel 10 but not channels 6 and 11 since those were scanned during Round 1.

This example shows how the background scan algorithm of a non-connected device automatically adjust the order of the channel scanning in order to shortcut and minimize the time it takes to report to the main controller the results of a successful scanning.

Long term, the average number that each channels has been scan is the same for all channels in case the device is scanning repetitively without finding anything.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for an unconnected device to perform Wireless Local Area Network (WLAN) background scanning, comprising steps of:
   (a) setting tpo, a duration the unconnected device is in sleep mode with power consumption PO;
   (b) scanning for one or more possible local WLAN Access Points (APs);
   (c) when either a packet or higher energy is detected during the scanning of step (b), changing scanning parameters comprising decreasing the tpo, widening bandwidth of one or more receiver filters, if previously scanning is in passive mode, switching to active mode, if previously scanning is in active mode, changing transmit power, and changing response expiration time, and continuing scanning using the changed scanning parameters; and
   (d) when neither a packet nor higher energy are detected during the scanning of step (b), entering sleep mode for the duration tpo, and, at the end of the duration tpo, returning to step (b), and, if neither a packet nor higher energy are detected during a subsequent scanning of step (b), entering sleep mode for the duration tpo without changing the duration tpo.

2. The method of claim 1, wherein step (c) further comprises:
   when an AP meeting a user criteria is found, stopping scanning and waking up a host controller.

3. The method of claim 1, wherein step (c) further comprises: when no AP meeting a user criteria is found, returning to step (a).

4. The method of claim 3, wherein step (a) comprises: increasing tpo from a previous scan.

5. The method of claim 4, wherein step (a) further comprises at least one of:
   widening bandwidth of one or more receiver filters;
   if previously scanning in passive mode, switching to active mode;
   if in active mode, changing transmit power;
   changing response expiration time; and
   changing an order of channels being scanned.

6. The method of claim 1, wherein the scanning in step (b) is performed in passive mode.

7. The method of claim 1, wherein scanning comprises one or more rounds, and each round of scanning involves two or more non-overlapping WLAN channels.

8. The method of claim 1, wherein changing scanning parameters in step (c) further comprises
   changing an order of channels being scanned.

9. The method of claim 2, wherein the user criteria comprises at least one of signal strength and wireless network identity.

10. The method of claim 2, wherein the user criteria comprises a Received Signal Strength Indicator (RSSI) threshold.

11. The method of claim 2, wherein the user criteria comprises one or more preferred or unwanted Extended Service Set Identifiers (ESSIDs).

12. A portable device, comprising:
   a receiver configured to receive Wireless Local Area Network (WLAN) signals; and
   one or more processors configured to perform background scanning for WLAN Access Points (APs) by steps of:
   (a) setting tpo, a duration the unconnected device is in sleep mode with power consumption PO;
   (b) scanning for one or more possible local WLAN Access Points (APs);
   (c) when either a packet or higher energy is detected during the scanning of step (b), changing scanning parameters comprising decreasing the tpo, widening bandwidth of one or more receiver filters, if previously scanning is in passive mode, switching to active mode, if previously scanning is in active mode, changing transmit power, and changing response expiration time, and continuing scanning using the changed scanning parameters; and
   (d) when neither a packet nor higher energy are detected during the scanning of step (b), entering sleep mode for the duration tpo, and, at the end of the duration tpo, returning to the scanning of step (b), and, if neither a packet nor higher energy are detected during a subsequent scanning of step (b), entering sleep mode for the duration tpo without changing the duration tpo.

13. The portable device of claim 12, wherein continuing scanning comprises:
   when an AP meeting a user criteria is found, stopping scanning and waking up a host controller.

14. The portable device of claim 12, wherein continuing scanning comprises:
   when no AP meeting a user criteria is found, increasing the tpo and returning to scanning.

15. The portable device of claim 14, wherein, before returning to scanning, the one or more processors performs at least one of:
   widening bandwidth of one or more receiver filters;
   if previously scanning in passive mode, switching to active mode;
   if in active mode, changing transmit power;
   changing response expiration time; and
   changing an order of channels being scanned.

16. The portable device of claim 12, wherein the scanning of step (b) is performed in passive mode.

17. The portable device of claim 12, wherein scanning comprises one or more rounds, and each round of scanning involves two or more non-overlapping WLAN channels.

18. The portable device of claim 12, wherein changing scanning parameters further comprises changing an order of channels being scanned.

19. The portable device of claim 13, wherein the user criteria comprises at least one of signal strength and wireless network identity.

20. The portable device of claim 13, wherein the user criteria comprises a Received Signal Strength Indicator (RSSI) threshold.

21. The portable device of claim 13, wherein the user criteria comprises one or more preferred or unwanted Extended Service Set Identifiers (ESSIDs).

* * * * *